United States Patent
Eppler et al.

(10) Patent No.: US 10,935,363 B2
(45) Date of Patent: Mar. 2, 2021

(54) DEVICE FOR DETECTING HIGHLY STRESSED POSITION IN A MACHINING TOOL

(71) Applicant: CHIRON-WERKE GmbH & Co. KG, Tuttlingen (DE)

(72) Inventors: Claus Eppler, Messstetten (DE); Pascal Schröder, Mühlheim an der Donau (DE)

(73) Assignee: CHIRON-WERKE GMBH & CO. KG, Tuttlingen (DE)

( * ) Notice: Subject to any disclaimer, the term of this patent is extended or adjusted under 35 U.S.C. 154(b) by 0 days.

(21) Appl. No.: 16/045,859

(22) Filed: Jul. 26, 2018

(65) Prior Publication Data

US 2019/0033053 A1 Jan. 31, 2019

(30) Foreign Application Priority Data

Jul. 26, 2017 (DE) ...................... 10 2017 116 869.9

(51) Int. Cl.
*G01B 7/16* (2006.01)
*G05B 19/4065* (2006.01)
(Continued)

(52) U.S. Cl.
CPC ............. *G01B 7/16* (2013.01); *B23Q 17/008* (2013.01); *G05B 19/4065* (2013.01); *G07C 3/005* (2013.01); *B23Q 17/22* (2013.01)

(58) Field of Classification Search
CPC ........ G01B 7/16; B23Q 17/008; B23Q 17/22; G05B 19/4065; G07C 3/005
(Continued)

(56) References Cited

U.S. PATENT DOCUMENTS 5,142,917 A 9/1992 Mussini et al.
5,243,533 A * 9/1993 Takagi ............... G05B 19/4065
 318/565

(Continued)

FOREIGN PATENT DOCUMENTS

CN 1550287 A 12/2004
CN 103884615 A 6/2014
(Continued)

OTHER PUBLICATIONS

European Search Report for corresponding European Application No. 18185498.5, dated Jan. 4, 2019.
(Continued)

*Primary Examiner* — Octavia Hollington
(74) *Attorney, Agent, or Firm* — Jason H. Vick; Sheridan Ross, PC

(57) ABSTRACT

Device for detecting highly stressed positions in a machining tool with a spindle head and a spindle motor, the device comprising: a measuring unit adapted to acquire measurement values of the spindle head during operation of the spindle unit, the measurement values having a current position of the spindle head; a memory unit adapted to store the measurement values acquired; a stress determining unit adapted to determine an associated stress value for each of the detected positions taking into account the measurement values; and an output unit adapted to at least one of outputting the detected positions with the respective associated stress value, and determining from a total number of the determined stress values at least one high stress value which is greater than the other stress values of the total number, and then outputting the at least one determined high stress value with the position assigned to it.

19 Claims, 2 Drawing Sheets

(51) Int. Cl.
*G07C 3/00* (2006.01)
*B23Q 17/00* (2006.01)
*B23Q 17/22* (2006.01)

(58) Field of Classification Search
USPC .......................................................... 73/787
See application file for complete search history.

(56) References Cited

U.S. PATENT DOCUMENTS

| | | | | |
|---|---|---|---|---|
| 5,568,028 | A | * | 10/1996 | Uchiyama .......... G05B 19/4065 318/433 |
| 5,602,347 | A | * | 2/1997 | Matsubara ......... G05B 19/4065 73/862.193 |
| 5,822,212 | A | * | 10/1998 | Tanaka ............... G05B 19/4063 700/174 |
| 6,892,110 | B2 | * | 5/2005 | Inoue ................. G05B 19/4065 700/175 |
| 7,854,575 | B2 | * | 12/2010 | Nishizaki ........... B23Q 17/2233 408/13 |
| 9,839,982 | B2 | | 12/2017 | Ando |
| 10,220,479 | B2 | * | 3/2019 | Nonaka ................... B23B 41/04 |
| 10,274,927 | B2 | * | 4/2019 | Saraie ................. G05B 19/402 |
| 2004/0174130 | A1 | | 9/2004 | Inoue et al. |
| 2009/0222306 | A1 | | 9/2009 | Bretschneider et al. |
| 2016/0297043 | A1 | * | 10/2016 | Inaguchi .............. B23Q 17/008 |
| 2016/0341631 | A1 | * | 11/2016 | Kamiya ................ G01M 13/00 |
| 2017/0001279 | A1 | | 1/2017 | Ando |
| 2017/0241759 | A1 | | 8/2017 | Werner et al. |
| 2018/0032052 | A1 | | 2/2018 | Ishii et al. |

FOREIGN PATENT DOCUMENTS

| | | |
|---|---|---|
| CN | 106312687 A | 1/2017 |
| CN | 107206559 A | 9/2017 |
| DE | 102005023252 A1 | 11/2006 |
| DE | 102005058038 B3 | 7/2007 |
| DE | 102014220313 A1 | 4/2016 |
| DE | 102016212023 A1 | 1/2017 |
| EP | 3001265 A1 | 3/2016 |
| JP | H06-308017 A | 11/1994 |
| JP | 2017-021002 A | 1/2017 |
| WO | WO 2016/135958 | 9/2016 |

OTHER PUBLICATIONS

First Office Action (Including Translation) for Chinese Application No. 201810831175.5, dated Mar. 20, 2020.

* cited by examiner

Fig. 3a  HLP: 50

| 34.5mm |
|---|

Fig. 3b  HLP: 50  52

| 34.5mm | 148 |
|---|---|

Fig. 3c  HLP: 50

| 34.5mm |
| 62.7mm |
| 11.2mm |

Fig. 3d  HLP: 50  52

| 34.5mm | 148 |
|---|---|
| 62.7mm | 141 |
| 11.2mm | 124 |

Fig. 3e  HLP: 50' 50 50"

| 34.5mm | 66.1mm |
|---|---|
| 62.7mm | 47.9mm |
| 11.2mm | 19.4mm |

Fig. 3f  HLP: 50' 50 50" 52

| 34.5mm | 66.1mm | 167 |
|---|---|---|
| 62.7mm | 47.9mm | 162 |
| 11.2mm | 19.4mm | 159 |

DEVICE FOR DETECTING HIGHLY STRESSED POSITION IN A MACHINING TOOL

CROSSREFERENCES TO RELATED APPLICATIONS

This application claims priority from German patent application 10 2017 116 869.9, filed on Jul. 26, 2017. The entire contents of this priority application are incorporated herein by reference.

BACKGROUND

This disclosure relates to a device for detecting highly stressed positions in a machining tool, the machining tool comprising a spindle unit having a spindle head and a spindle motor.

A machining tool can be used to machine workpieces with high precision. However, it is known that the machining accuracy of a machining tool decreases over time. Cycles can therefore be defined in which the moving parts of a machining tool are replaced. Alternatively or additionally, it is possible to check by means of random samples of the manufactured workpieces whether the workpieces are still being manufactured within the specified tolerances. If this is no longer the case, the moving elements of a machining tool are replaced.

It is an object of this disclosure to provide a device where the necessity of replacing moving parts of the machining tool can be recognized more effectively.

According to one aspect there is provided a device for detecting highly stressed positions in a machining tool with a spindle unit having a spindle head and a spindle motor, the device comprising: a measuring unit adapted to acquire measurement values related to a spindle head of the spindle unit during operation of the spindle unit, the measurement values having a current position of the spindle head relative to a fixed point of the machining tool; a memory unit adapted to store the measurement values acquired by the measuring unit; a stress determining unit adapted to determine an associated stress value for each of the detected positions taking into account the measurement values acquired in the memory unit; and an output unit adapted to at least one of outputting the detected positions with the respective associated stress value, and determining from a total number of the determined stress values at least one high stress value which is greater than the other stress values of the total number, and then outputting the at least one determined high stress value with the position assigned to it.

In the context of the disclosure, the inventors recognized that the conventional approaches to determining whether the moving parts of a machining tool need to be replaced have disadvantages. For example, cyclical replacing can lead to the moving parts being replaced even though the machining tool is still manufacturing with a precision within the specified tolerances, or moving parts are not yet being replaced even though the precision of the production has already left a permitted tolerance window. Sampling makes it possible to check the precision of production very precisely, but such a check can be very time-consuming, especially if the inspection itself is to be carried out with a high degree of precision.

SUMMARY OF THE DISCLOSURE

According to one aspect of the disclosure, the current position of the spindle head relative to a fixed point of the machining tool is recorded during operation of the spindle unit. The fixed point can essentially be selected freely, provided that the constantly changing position of the spindle head can be detected during its displacement and that it can be detected when the spindle head is again at a previously reached position. In particular, a housing of the machining tool or a foot of the machining tool can be selected as a fixed point. For some exemplary embodiments a stop of the spindle head may be selected as a fixed point, which limits a displacement of the spindle head along its direction of displacement.

The measurement values can be recorded at constant or variable intervals. The intervals can refer both to a progression with regard to time and a progression with regard to the place. Combined data acquisition is also possible. In particular, a measured value is recorded if a certain time interval or a certain distance interval has been exceeded. If the focus is on reducing the measured values recorded, they can also be recorded in such a way that a measured value is only recorded if a certain time interval and a certain distance interval have been exceeded.

It is also possible to fit the measured values into a predefined grid. This can be done, for example, by rounding. This makes it easy to suppress small measurement errors. In particular, this prevents the spindle head from being assigned a different position due to a small measuring error, even though it is actually again at a previously reached position. It is preferred that additional virtual measured values are generated between two recorded measured values. This is based on the assumption that a large part of the displacements of the spindle head occur at a constant speed. Based on this assumption, it is then possible, based on the information that the spindle head was at a first position at a first time and at a second position at a second time, to calculate intermediate virtual measured values of the position by interpolation.

The measured values are stored in the memory unit. If additional virtual measured values are generated, these are also stored in the memory unit. If the required storage space is to be kept small, only a subset of the recorded measured values can be stored, for example only every second, third, fourth, etc. measured value. However, for some exemplary embodiments it is preferable to have fewer measured values recorded by the measuring unit, for example by increasing the above-mentioned intervals.

The stress determination unit has access to the measurement values recorded in the memory unit. Depending on the design, the stress determination unit can use all stored measured values or only a part of the stored measured values to determine the assigned stress value. It is also possible that the stress determination unit uses only part of the information contained in a measured value if the measured value contains several information components, as explained below. Such additional values are explained below.

If the stress determination unit is only to determine the stress value based on measurement values describing a current position of the spindle head, the stress determination unit determines the stress value for a position by counting how often the spindle head was at that position. Accordingly, a different stress value is assigned to a first position at which the spindle head was more frequently than at a second position, in particular a higher stress value, from which it can be derived that a higher stress is assumed at the first position than at the second position.

The output unit outputs the information obtained either during operation or after the end of operation. It is a possibility to output all acquired positions or only a part of all acquired positions with the respective assigned stress value. Thresholds can also be used, in particular that a detected position is only output if an assigned stress value exceeds a specified or predefinable stress value. The positions acquired can be sorted according to the magnitude of the stress value. This type of output is particularly suitable for pictorial representation, for example by means of a graph or a colored representation.

For some exemplary embodiments, the output unit should be configured to output the specified detected positions with the respective assigned stress value. This also includes simple designs in which the output unit only outputs an acquired position or positions without the respective stress value. The output unit may also have a logic circuit or be connected to a logic circuit that suppresses output of positions and stress values if the stress value is below a predetermined threshold value. The output unit can also be configured to output the specified acquired positions without the respective assigned stress value.

For some exemplary embodiments, the output unit determines at least one high stress value from a total number of the determined stress values, which is greater than the other stress values of the total number. The at least one determined high stress value is then output with the position assigned to it. It is possible to output only the maximum high stress value, if necessary with the position assigned to it, but also the N highest high stress values, where N>1.

This provides the user with simple information about the location of a highly stressed position of the machining tool. An analysis of whether any moving parts of the machining tool need to be replaced can now be carried out either at a specific point on the machining tool or at the corresponding point of a finished workpiece. The manufacturing precision of the machining tool can thus be checked in less time and/or more closely.

For some exemplary embodiments, the device also has a timer configured to generate continuous time information during operation of the spindle unit and to output the time information in time to the measured values acquired.

The time information can be used directly or indirectly to determine the stress value. Direct use can be made in particular by assigning a time to a position either in addition to or as an alternative to the above-mentioned frequency to determine how long the spindle head has been at a certain position. For example, if the use of the machining tool justifies the assumption that a higher stress will occur at a position where the spindle head remains longer, the stress value can be assigned to a specific position with respect to the respective duration. A preferred indirect use of time information results from the fact that it is used for a calculation of a current spindle head speed at a certain position. This makes it possible to take into account the inventors' assumption that positions passed at high speed are subject to a higher stress than positions passed at low speed. Accordingly, when viewed in isolation, only one measured value is assigned to a first position that is passed through at a higher speed than a second position, in particular a higher stress value.

For some exemplary embodiments, the measured values also have an additional value that shows the speed of the spindle head relative to the fixed point.

In this embodiment, the spindle head speed is already included in the measured values. A possible use of speed has already been explained for some exemplary embodiments. For some exemplary embodiments it may be preferred that the speed is measured directly, preferably by a speed sensor on the spindle head. It should be noted that if this and/or the following additional values are taken into account, several additional values can be taken into account when assigning a stress value. It is also possible to evaluate the same additional value differently, for example, once with regard to an average value and once with regard to a maximum value, and to include both evaluations in the assignment of the stress value.

For some exemplary embodiments, the measured values also have an additional value that accelerates the spindle head relative to the fixed point.

These embodiments take into account the inventors' assumption, similar to speed considerations, that positions with a high acceleration are subjected to a higher stress than positions with a lower acceleration. Similarly, when only one measured value is considered in isolation, a different stress value is then assigned to a first position at which a high acceleration is given, in particular a higher stress value than for a second position at which a lower acceleration is present. For some exemplary embodiments, acceleration may be measured at the spindle head, in particular by an accelerometer.

For some exemplary embodiments, the additional value is obtained from a control program of the machining tool.

These embodiments take into account the the inventor's realization that the control commands for the spindle head can be used to calculate at which positions the spindle head has which speed and/or which acceleration. In this case, speed and/or acceleration values can be taken into account when assigning a stress value, without having to provide a speed sensor and/or an accelerometer on the spindle head. When obtaining the additional value, be it speed or acceleration, general knowledge about the movement characteristics of the spindle head can be incorporated. If, for example, the temporal course of speed and/or acceleration during a displacement by 1 mm, by 1 cm and/or by 10 cm is known, the actual speeds and/or accelerations can be determined quite accurately from a certain positional displacement command.

For some exemplary embodiments, the measured values have an additional value indicating a mechanical stress acting on the spindle head.

For these embodiments, the mechanical stress that is applied to the spindle head when machining a workpiece clamped in the machining tool is recorded. It is assumed that a position where the spindle head is under a higher mechanical stress is subjected to a higher stress than a second position where the spindle head is subjected to a lower mechanical stress. The mechanical stress acting on the spindle head can be determined by determining a force, a torque, a torsion or a bend, as well as by combining two or more of these measured variables. Although it is also possible here to obtain the additional value from a control program, the correspondence with reality is believed to be less than desired.

For some exemplary embodiments the measured values also have an additional value that has a current flowing into the spindle motor.

These embodiments take into account the inventors' assumption that the current flowing into the spindle motor has an effect on the stress at a certain position. In particular, it is assumed that a high current leads to a higher stress at a position than a lower current. Accordingly, a different stress value is assigned to a first position at which a high current value is measured, especially a higher stress value, than to a second position at which a lower current value is measured. Although it is also possible here to obtain the additional value from a control program, the correspondence with reality is believed to be less than desired.

For some exemplary embodiments, the measured values also have an additional value that indicates a rotational speed of a tool insert of the spindle head.

These embodiments take into account the inventors' assumption that the speed of a tool insert of the spindle head has an effect on the stress on a position. In particular, it is assumed that a high rotational speed leads to a higher stress at a position than a lower rotational speed. Accordingly, a different stress value is assigned to a first position at which a high speed is measured, in particular a higher stress value, than to a second position at which a lower speed is measured, when only one measured value is considered in isolation. Here, too, it is possible to obtain the additional value from a control program, especially if speed control is used.

For some exemplary embodiments, the stress value is determined in such a way or it is taken into account in the determination of the stress value that a higher value is assigned to a first position that was measured more often than to a second position that was measured less often than the first position.

This approach offers an easy way of assigning corresponding stress values to different positions on the basis of acquired positions alone, but also in connection with one or more additional values. In particular, the resulting information can then be output as frequency distribution.

For some exemplary embodiments, the stress value is determined in such a way or it is taken into account in the determination of the stress value that a first position at which a first sum of the additional values recorded at the first position is greater is assigned a higher value than a second position at which a second sum of the corresponding additional values recorded at the second position is less.

These embodiments make use of the inventors' assumption that the stress on a position is cumulative based on several individual stresses. It is also assumed that a high stress can result from both a one-off high stress and a large number of small stresses. Preferably, the measured values are weighted during summation. This corresponds to the assumption that a high stress is not equivalent to, for example, ten times one tenth of this stress. Experience has shown that wear caused by stress increases disproportionately, i.e. more than linearly, compared to several times lower stresses. It is therefore possible to apply a factor greater than 1 to high stresses in order to take this effect into account.

For some exemplary embodiments, the stress value is determined in such a way or it is taken into account in the determination of the stress value that a higher value is assigned to a first position at which a first maximum of the additional values detected at the first position is greater than a second position at which a second maximum of the corresponding additional values detected at a second position is less.

These embodiments make use of the inventors' assumption that in particular a high additional value causes the stress at a certain position. It can be assumed that a first position with a larger maximum than a second position is also subject to greater wear. In some exemplary embodiments the maximum is taken into account in conjunction with a further evaluation when assigning the stress value.

For some exemplary embodiments, the stress value is determined in such a way or it is taken into account in the determination of the stress value that an additive element or a factor is applied to measured values, in particular to additional values exceeding a specified threshold value.

These embodiments make use of the inventors' assumption that low measured values, including any additional values, have hardly any effect on wear and the corresponding positions can therefore be regarded as low stressed. However, if high measured values, including the additional values, are available, a high stress must be assumed. This high stress should also be noticeable, even if the absolute number of such cases is low. Accordingly, the additive element can be negative for low measured values or a factor smaller than 1 is selected, whereas alternatively or additionally for high measured values, the additive element can be positive or a factor larger than 1 is selected.

For some exemplary embodiments, the measuring unit is further adapted to acquire further measured values related to the spindle head during operation of the spindle unit, the further measured values having a current further position of the spindle head along a further axis which is at an angle to an axis along which the detected positions are determined; the memory unit is further adapted to store the further measured values acquired by the measuring unit; the stress determination unit is further configured to determine an associated stress value, taking into account the measured values recorded in the memory unit and other measured values, for each position value pair of recorded positions and other positions; and the output unit is further adapted to at least one of outputting the position value pairs with the respective assigned stress value and determining from a total number of the determined stress values at least one high stress value which is greater than the other stress values of the total number, and outputting the at least one determined high stress value with the respective assigned position value pair.

It is understood that the features mentioned above and those to be explained below can be used not only in the combination indicated, but also in other combinations or be used in isolation, without leaving the scope of this disclosure.

BRIEF DESCRIPTION OF THE DRAWINGS

Exemplary embodiments are shown in more detail in the drawings and are explained in more detail in the following description. In the drawings:

FIGS. 3a-3f show different versions of an output from the output unit; and

DESCRIPTION OF PREFERRED EMBODIMENTS

Figure 1:
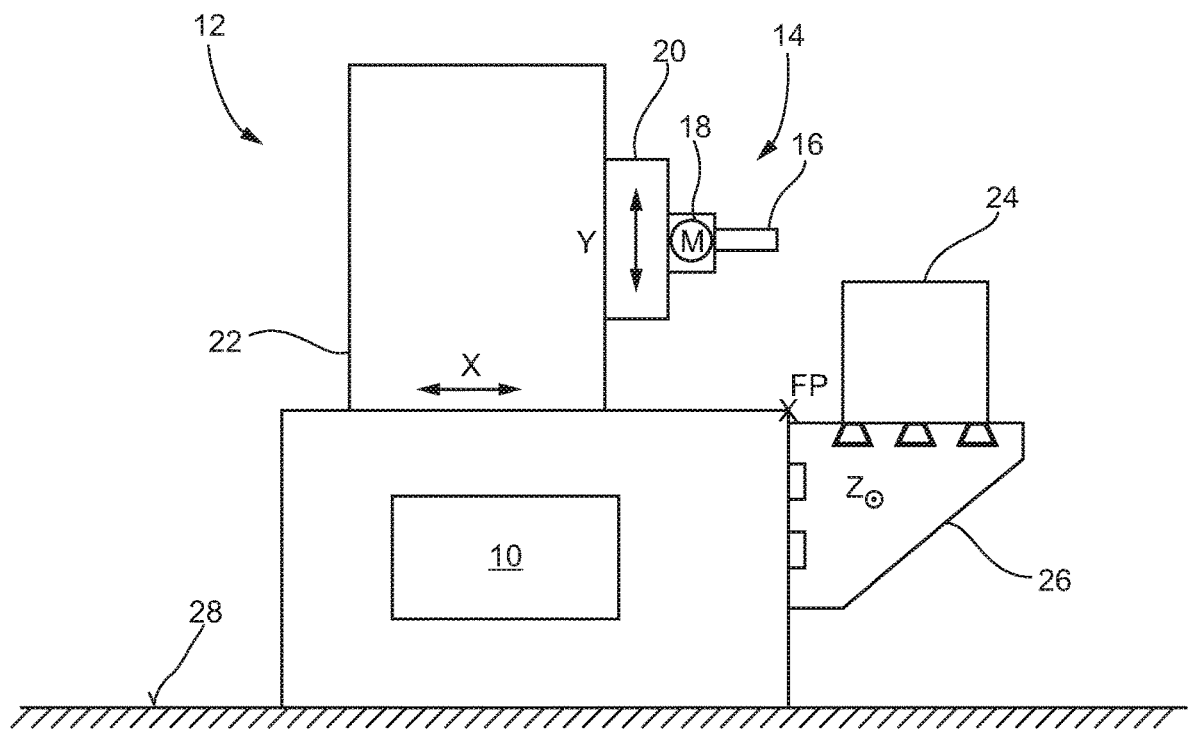
FIG. 1 is an embodiment of a machining tool with a device for determining highly stressed positions according to an embodiment.

FIG. 1 shows a device 10 for determining highly stressed positions 50 (see FIG. 3) on a machining tool 12 with a spindle unit 14 having a spindle head 16 and a spindle motor 18.

Machining tool 12 shown here is only an example of a machining tool, specifically a machining tool in console bed design. It can be seen that the spindle head 16 can be moved in the Y direction by means of a first displacing unit 20 and in the X direction by means of a second displacing unit 22. Furthermore, the workpiece 24 can be moved in the Z direction on a third displacing unit 26. Furthermore, a fixed point FP of machining tool 12 is shown, which is fixed to a symbolic earth surface 28 for all machining operations of machining tool 12. The fixed point FP can also be selected, for example, as a foot of machining tool 12.

Figure 2:
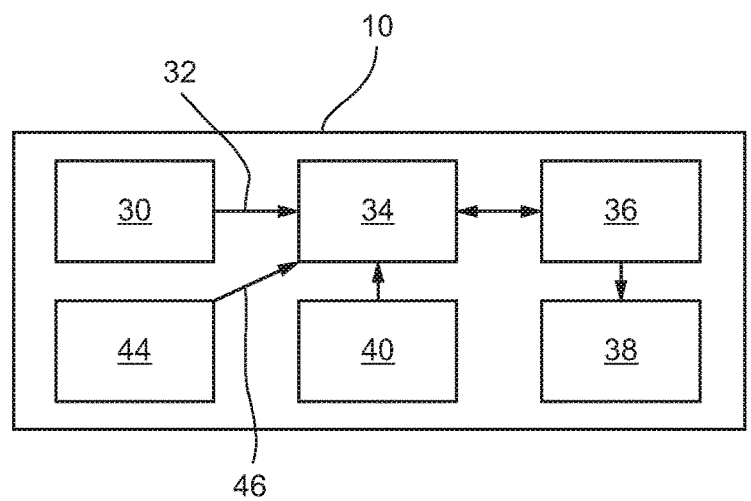
FIG. 2 shows details of the device of FIG. 1.

FIG. 2 shows elements of fixture 10 of FIG. 1. A measuring unit 30 is configured to record measured values related to the spindle head 16 during operation of the spindle unit 14, the measured values 32 having a current position 50 of the spindle head 16 relative to the fixed point FP of the machining tool 12.

A memory unit 34 is configured to store the measurement values 32 acquired by the measurement unit 30. A stress determination unit 36 is configured to determine an assigned stress value 52 for each of the detected positions 50, taking into account the measured values 32 recorded in the memory unit 34.

An output unit 38 is adapted to output the detected positions 50 with the respective associated stress value 52 or to determine from a total number of the determined stress values 52 at least one high stress value which is greater than the other stress values of the total number, and to output the at least one determined high stress value with the position 50 assigned to it. For the exemplary embodiment shown, the output unit 38 can have a screen.

A timer 40 is configured to generate continuous time information 42 during operation of spindle unit 14 and to output time information 42 simultaneously with the acquired measurement data 32. Finally, a control program 44 is shown from which additional values 46 can be obtained.

FIG. 3 shows some versions of the output HLP of the output unit 38. Variant a) only shows the position 50 at which the highest stress value was determined. Variant b) indicates the highest stress value 52 with the position 50 assigned to it. Variant c) displays the positions 50 of the three highest stress values in descending order with respect to the stress value. Variant d) indicates the three highest stress values 52 in descending order with the respective assigned position 50.

Variant e) indicates the three positions 50 with the highest stress values 52, each of the positions being described by a detected position 50' along a first direction, for example the X direction, and a further position 50" along a second direction, for example the Y direction. Variant f) is similar to variant e), but now the corresponding stress values 52 are also output here.

Figure 4:
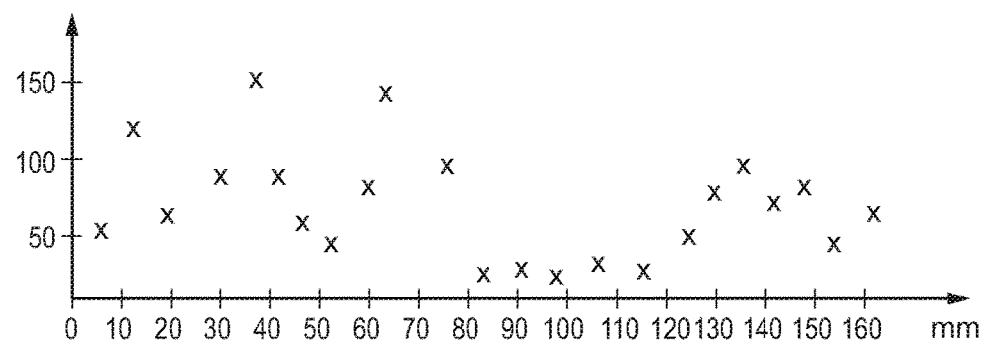
FIG. 4 shows another form of output of the output unit.

FIG. 4 shows another type of output of the output unit 38: Positions 50 are shown along the x-axis and the stress values 52 are shown along the y-axis. The points marked with a cross show which position is assigned to which stress value and vice versa.

What is claimed is:

1. A device adapted to detect highly stressed positions in a machining tool, the machining tool having a spindle unit having a spindle head and a spindle motor, the device comprising:
    a measuring unit, in communication with the spindle head, and adapted to measure values related to the spindle head during operation of the spindle unit, the measured values including a detected current position of the spindle head relative to a fixed point of the machining tool;
    a memory, in communication with and connected to the measuring unit, adapted to store the measured values read by the measuring unit;
    a stress determination unit, in communication with the memory, and adapted to determine an associated stress value for each of the detected positions at least based on the measured values recorded in the memory unit; and
    an output adapted to at least one of output the detected positions with the respective associated stress value, and determine, from a total number of the determined stress values, at least one high stress value which is greater than the other stress values of the total number of the determined stress values, and then output the at least one determined high stress value with the position associated therewith, wherein the stress value is determined at least based on a first position which has been detected more often in the measured values being assigned a higher value than a second position which has been detected less often in the measured values than the first position.

2. The device according to claim 1, further comprising a timer adapted to generate continuous time information during operation of the spindle unit and to output the time information simultaneously with the acquired measured values.

3. The device according to claim 1, wherein the measured values further comprising an additional value comprising a speed of the spindle head relative to the fixed point.

4. The device according to claim 3, wherein the additional value is obtained from a control program of the machining tool.

5. The device according to claim 1, wherein the measured values further comprising an additional value comprising an acceleration of the spindle head relative to the fixed point.

6. The device according to claim 5, wherein the additional value is obtained from a control program of the machining tool.

7. The device according to claim 1, wherein the measured values further comprise an additional value comprising a mechanical stress acting on the spindle head.

8. The device according to claim 1, wherein the measured values further comprise an additional value comprising a current flowing into the spindle motor.

9. The device according to claim 1, wherein the measured values further comprise an additional value comprising a rotational speed of the spindle head.

10. The device according to claim 1, wherein the stress value is determined at least based on a first position at which a first sum of the additional values detected at the first position is greater is assigned a higher value than a second position at which a second sum of the corresponding additional values detected at the second position is less.

11. The device according to claim 1, wherein the stress value is determined at least based on a first position at which a first maximum of the additional values detected at the first position is greater is assigned a higher value than a second position at which a second maximum of the corresponding additional values detected at the second position is less.

12. The device according to claim 1, wherein the stress value is determined at least based on an additive element or a factor applied to measured values which exceed a predetermined threshold value.

13. The device according to claim 1, wherein
    the measuring unit is further adapted to acquire further measured values from the spindle head during operation of the spindle unit, the further measured values comprising a current further position of the spindle head along a further axis which is at an angle to an axis along which the detected positions are determined;
    the memory is further adapted to store the additional measurement values acquired by the measuring unit;

the stress determination unit further adapted to determine an associated stress value, at least based on the measured values recorded in the memory unit and further measured values, for each position value pairs of detected positions and further positions; and the output further adapted to at least one of output the position value pairs with the respective associated stress value and determine from a total number of the determined stress values at least one high stress value which is greater than the other stress values of the total number, and then output the at least one determined high stress value with the respective associated position value pair.

14. A method to detect highly stressed positions in a machining tool, the machining tool having a spindle unit having a spindle head and a spindle motor, the method comprising:

measuring values related to the spindle head during operation of the spindle unit, the measured values including a detected current position of the spindle head relative to a fixed point of the machining tool;

storing the measured values read by the measuring unit;

determining an associated stress value for each of the detected positions at least based on the measured values recorded in the memory unit; and at least one of outputting the detected positions with the respective associated stress value, and determining from a total number of the determined stress values at least one high stress value which is greater than the other stress values of the total number of the determined stress values, and then outputting the at least one determined high stress value with the position associated therewith, wherein the stress value is determined at least based on a first position which has been detected more often in the measured values being assigned a higher value than a second position which has been detected less often in the measured values than the first position.

15. The method of claim 14, further comprising generating continuous time information during operation of the spindle unit and outputting the time information simultaneously with the acquired measured values.

16. The method of claim 14, wherein the measured values further comprise an additional value comprising a speed of the spindle head relative to the fixed point.

17. The method of claim 14, wherein the measured values further comprise an additional value comprising a mechanical stress acting on the spindle head.

18. The method of claim 14, wherein the measured values further comprise an additional value comprising a current flowing into the spindle motor.

19. The method of claim 14, wherein the measured values further comprise an additional value comprising a rotational speed of the spindle head.

\* \* \* \* \*